(12) United States Patent
Oda

(10) Patent No.: US 7,399,090 B2
(45) Date of Patent: Jul. 15, 2008

(54) PROJECTOR

(75) Inventor: Akihiro Oda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/762,920

(22) Filed: Jun. 14, 2007

(65) Prior Publication Data

US 2007/0291237 A1    Dec. 20, 2007

(30) Foreign Application Priority Data

Jun. 15, 2006   (JP) .............................. 2006-165430

(51) Int. Cl.
  *G03B 21/22*   (2006.01)
  *F16M 13/00*   (2006.01)
  *A47B 91/00*   (2006.01)
(52) U.S. Cl. ...................... 353/119; 353/100; 353/122; 248/415; 248/349.1
(58) Field of Classification Search ................ 353/100, 353/101, 119, 122; 248/188.2, 188.8, 677, 248/125.7, 131, 415, 349.1
See application file for complete search history.

(56) References Cited

U.S. PATENT DOCUMENTS

| 7,021,774 | B2 * | 4/2006 | Zoidis et al. | 353/119 |
| 7,270,306 | B2 * | 9/2007 | Chen | 248/188.2 |
| 2005/0024605 | A1 * | 2/2005 | Hamada | 353/119 |

FOREIGN PATENT DOCUMENTS

| JP | 11-014958 | | 1/1999 |
| JP | 2002296670 | A * | 10/2002 |
| JP | 2004-109359 | | 4/2004 |

* cited by examiner

*Primary Examiner*—Rochelle-Ann Blackman
(74) *Attorney, Agent, or Firm*—Global IP Counselors, LLP

(57) ABSTRACT

A projector includes a main body, a lens unit and a lens cover. The main body includes a housing and a groove formed on a bottom face of the housing. The lens unit is provided to the main body. The lens cover is configured to cover the lens unit. The lens cover is further configured to be fitted to the groove so that the lens cover rotatably supports the main body.

6 Claims, 3 Drawing Sheets

PROJECTOR

CROSS-REFERENCE TO RELATED APPLICATIONS

This application claims priority to Japanese Patent Application No. 2006-165430 filed on Jun. 15, 2006. The entire disclosure of Japanese Patent Application No. 2006-165430 is hereby incorporated herein by reference.

BACKGROUND OF THE INVENTION

1. Field of the Invention

The present invention generally relates to a projector. More specifically, the present invention relates to a projector having a lens cover configured to be fitted to a lens unit of a main body.

2. Background Information

A conventional projector includes a main body, a lens unit and a lens cover. The lens unit is provided to the main body. The lens cover is fitted to the lens unit and connected to the main body with a cord. When the lens cover is removed from the lens unit and the conventional projector is moved, the lens cover ends up underneath the projector. Then, the projector gets unbalanced and susceptible to damage. With the conventional projector, the lens cover is used only for covering the lens unit of the main body.

Another conventional projector (see Japanese Laid-Open Patent Application No. 2004-109359, for example) includes a main body case and a protective cover. The protective cover covers at least part of the main body case of the projector. A convex component is formed on the bottom face of the main body case. A circular through-hole is formed in the protective cover. The convex component has an arced cross sectional shape and is fitted into the through-hole. When the projector is used, the protective cover is used as a stand for holding the main body case. When the main body case is placed on the protective cover serving as a stand, the main body case is allowed to be inclined vertically and rotated horizontally. With the conventional projector, the protective cover having the circular through-hole is required to have a rotating mechanism for rotatably supporting the main body case.

Another conventional projector (see Japanese Laid-Open Patent Application H11-14958, for example) includes a main body, a lens unit, a lens protection device having a lens cover and a handle. The lens unit is provided to the main body. The handle is provided to the lens cover. When the main body is carried by grasping the handle, the lens cover automatically rotated or slid over the lens unit, thereby blocking off the lens unit. Therefore, there is no worry about forgetting to attach a lens cap or the like, and the lens unit is protected. When the conventional projector is to be used, the lens unit can be uncovered by moving the lens cover. The lens cover is merely used to protect the lens unit. The conventional projector has no rotating mechanism for rotatably supporting the main body.

In view of the above, it will be apparent to those skilled in the art from this disclosure that there exists a need for an improved projector. This invention addresses this need in the art as well as other needs, which will become apparent to those skilled in the art from this disclosure.

SUMMARY OF THE INVENTION

It is an object of the present invention to provide a projector having a rotating mechanism for rotatably supporting a main body of the projector without increasing components.

In accordance with one aspect of the present invention, a projector includes a main body, a lens unit and a lens cover. The main body includes a housing and a groove formed on a bottom face of the housing. The lens unit is provided to the main body. The lens cover is configured to cover the lens unit. The lens cover is further configured to be fitted to the groove so that the lens cover rotatably supports the main body.

With the projector of the present invention, the lens cover is fitted to the groove so that the lens cover rotatably supports the main body of the projector. Therefore, it is possible to provide a projector having a rotating mechanism for rotatably supporting a main body of the projector without increasing components.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
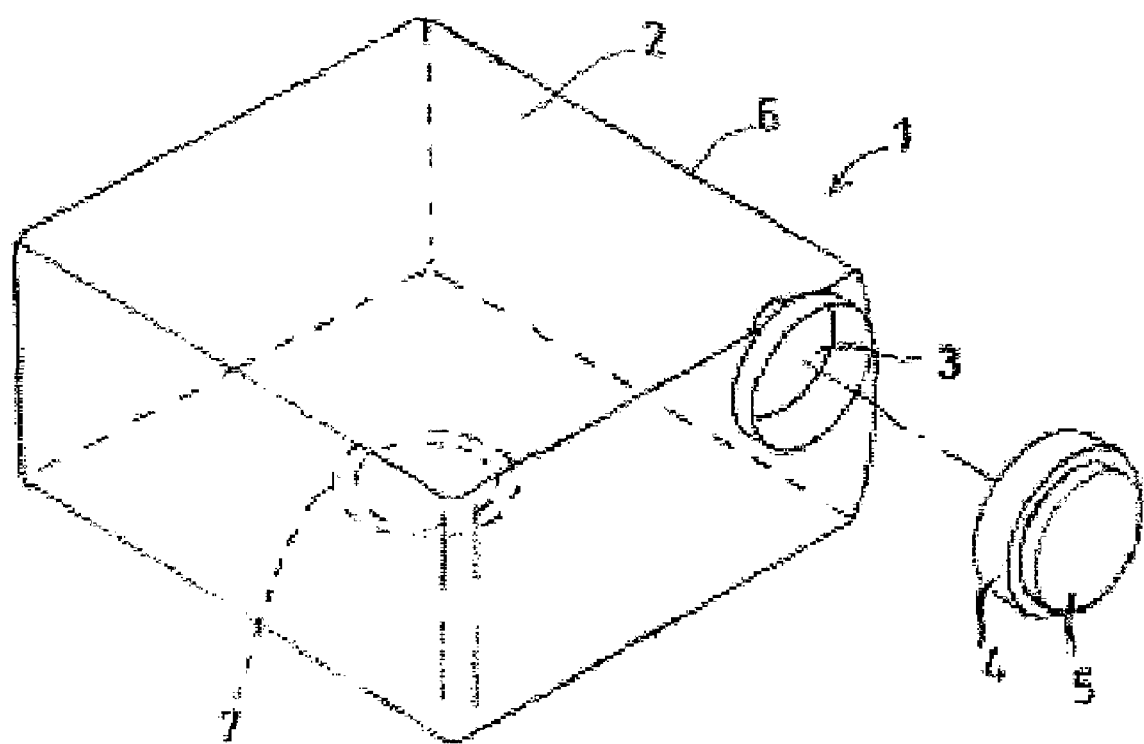
FIG. 1 is an oblique view of a state in which a lens cover has been removed from a projector in a first embodiment of the present invention.
Figure 2A:
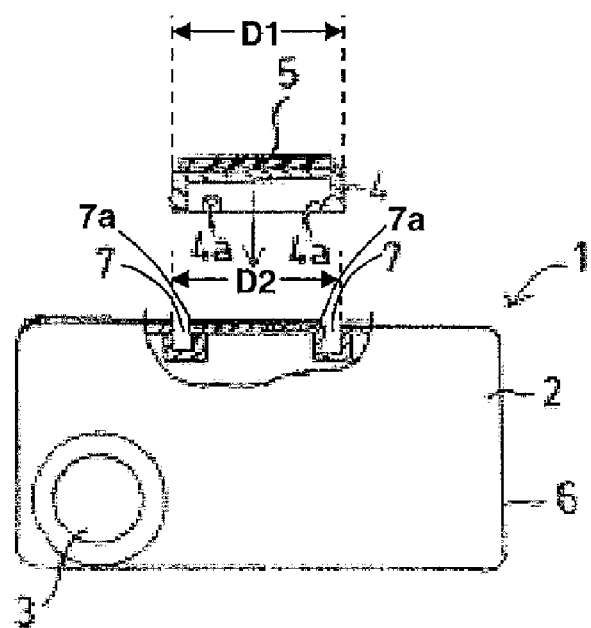
FIG. 2a is a partially cut-away front view of a state in which a main body has been turned over, and the lens cover has yet to be fitted into a groove in the main body.
Figure 2B:
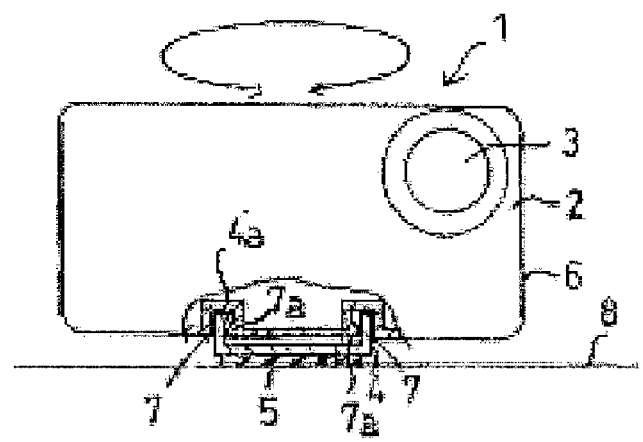
FIG. 2b is a partially cut-away front view of a state in which the lens cover has been fitted into the groove in the main body.

As shown in FIG. 1, a projector 1 of a first embodiment includes a main body 2, a lens unit 3 and a lens cover 4. The projector 1 receives a video signal and projects a corresponding image on a projection screen. The projector 1 is a LCD projector. However, the projector 1 is not limited to the LCD projector. The projector 1 can be other types of projectors, e.g., a CRT projector, a DLP projector and so on. The main body 2 includes a housing 6 and a groove 7. The housing 6 houses a light bulb (not shown), an image processor (not shown) and so on. The groove 7 is formed on a bottom face of the housing 6. The groove 7 is formed in a circle, and formed in an approximate center of a bottom face of the housing 6. As shown in FIGS. 2a and 2b, the groove 7 has a latching prong 7a facing outward in the groove 7.

The lens unit 3 is provided to an outside of the main body 2 with exposing to a front side of the main body 2. The lens cover 4 has a bottomed cylindrical shape. The lens cover 4 is configured to be fitted to the lens unit 3 and cover the lens unit 3. An anti-slip sheet 5 (or anti-slip member) is fixed to a front face of the lens cover 4. Specifically, the anti-slip sheet 5 is affixed to the front face of the lens cover 4. The anti-slip sheet 5 consists of a rubber material, a sheet of material, or the like. Further, as shown in FIGS. 2a and 2b, latching protrusions 4a are formed at a distal end of the lens cover 4. The latching protrusions 4a face inward at a plurality of locations (at three locations, for example) along a circumferential direction of the distal end of the lens cover 4. The lens cover 4 has approximately the same diameter D1 as a diameter D2 of the groove 7.

As shown in FIG. 2b, when the distal end of the lens cover 4 is fitted into the groove 7, the latching protrusions 4a latch with the latching prong 7a. As a result, the lens cover 4 is attached so as not to come loose from the bottom face of the housing 6 of the main body 2. When the lens cover 4 is attached to the groove 7, the anti-slip sheet 5 of the lens cover 4 is located on a lower side of the lens cover 4. Specifically, the anti-slip sheet 5 is disposed in contact with a flat surface 8, such as a top surface of a table, which prevents the lens cover 4 from slipping on the flat surface 8. Therefore, the main body 2 is supported rotatably with respect to the lens cover 4 on the flat surface 8.

With the projector 1 of the first embodiment, the main body 2 is configured to be rotatably supported by fitting the lens cover 4 into the groove 7 in the bottom face of the housing 6. In other words, the lens cover 4 is used as a rotating base (or rotating mechanism) while the lens cover 4 still retains the original shape. Therefore, with the projector 1, a rotating mechanism for rotatably supporting the main body 2 of the projector 1 is provided without increasing components. Furthermore, the lens cover 4 is prevented from unintentionally being separated from the housing 6 by latching the latching protrusions 4a of the lens cover 4 to the latching prong 7a of the groove 7 in the housing 6. Therefore, the lens cover 4 is prevented from ending up underneath the main body 2. Also, the lens cover 4 is prevented from rotating by the anti-slip sheet 5 on the front face of the lens cover 4 so that just the main body 2 rotates freely.

Second Embodiment

Figure 3:
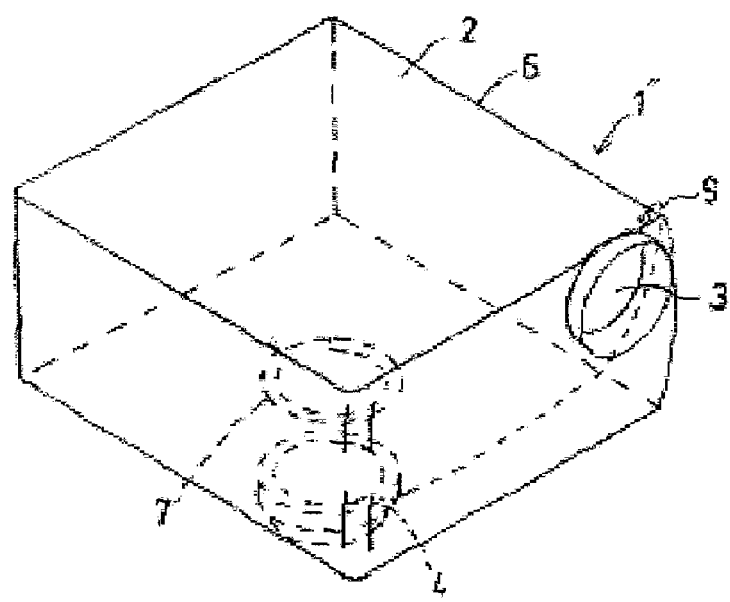
FIG. 3 is an oblique view of a state in which a lens cover of a projector in a second embodiment is disposed via a cord at a location corresponding to a groove in a bottom face of a main body.
Figure 4:
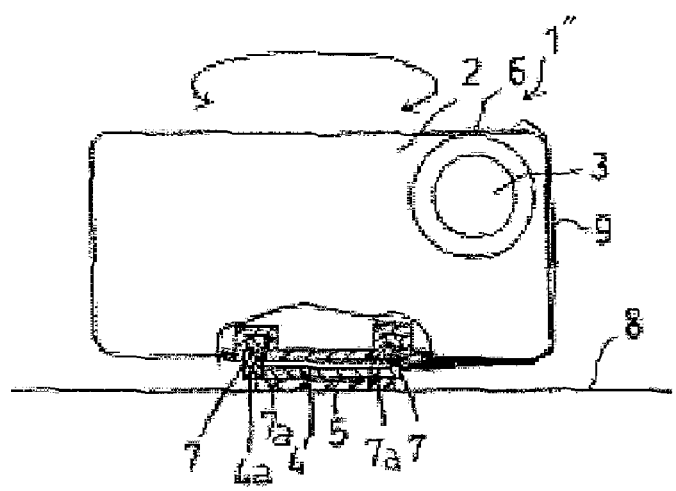
FIG. 4 is a partially cut-away front view of a state in which a distal end of the lens cover has been fitted into the groove in the bottom face of the main body.

Referring now to FIGS. 3 and 4, a projector in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a double prime (").

As shown in FIG. 3, a projector 1" of the second embodiment further includes a cord 9 attached between the housing 6 of the main body 2 and the lens cover 4. One end of the cord 9 is attached near the lens unit 3 of the housing 6, and the other end of the cord 9 is attached to the lens cover 4. Specifically, the one end of the cord 9 is tied between two holes formed near the lens unit 3 of the housing 6, and the other end is tied in a hole formed near a bottom of the lens cover 4. The cord 9 is long enough for the lens cover 4 to be disposed at a location corresponding to the groove 7 in the bottom face of the housing 6. Specifically, the length of the cord 9 is approximately the same as a distance along a surface of the housing 6 between a location where the one end of the cord 9 is tied and an edge of the groove 7. Therefore, the lens cover 4 is positioned by the cord 9 to a location corresponding to the groove 7 with the main body 2 in its regular orientation (operating orientation).

With the second embodiment, the distal end of the lens cover 4 is simply and securely fitted into the groove 7 in the housing 6 without having to turn over the main body 2, which means that less work is entailed. When the main body 2 is rotated, it can be freely rotated, without obstruction, by removing the cord 9 from the housing 6 of the main body 2. Specifically, the one end of the cord 9 that is tied to the housing 6 is untied and removed when the main body 2 is rotated.

General Interpretation of Terms

In understanding the scope of the present invention, the term "comprising" and its derivatives, as used herein, are intended to be open ended terms that specify the presence of the stated features, elements, components, and/or groups, but do not exclude the presence of other unstated features, elements, components, and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, front, top, bottom, below and transverse" as well as any other similar directional terms refer to those directions of a projector equipped with the present invention. Accordingly, these terms, as utilized to describe the present invention should be interpreted relative to a projector equipped with the present invention as used in the normal operating position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A projector comprising:
 a main body including a housing with a groove formed on a bottom face of the housing, the groove being formed in an approximate center of the bottom face of the housing, the groove being formed in a circle;
 a lens unit provided to the main body; and
 a lens cover configured to cover the lens unit, the lens cover further configured to be fitted to the groove so that the lens cover rotatably supports the main body, the lens cover including an anti-slip member fixed to a front face of the lens cover, the lens cover having a bottomed cylindrical shape, a distal end of the lens cover being configured to engage the groove,
 the anti-slip member being located on a lower side of the lens cover when the lens cover is fitted to the groove, and
 a diameter of the lens cover being approximately the same as a diameter of the groove.

2. The projector according to claim 1 further comprising a cord attached between the housing and the lens cover.

3. The projector according to claim 2, wherein one end of the cord is attached to the housing and the other end of the cord is attached to the lens cover, and
the cord is long enough for the lens cover to be disposed at the groove.

4. The projector according to claim 3, wherein
a length of the cord is approximately as same as a distance along the housing between a location where the one end of the cord is attached and a edge of the groove so that the lens cover is positioned by the cord at the groove with the main body in a regular orientation.

5. The projector according to claim 4, wherein
the lens cover includes a latching protrusion at a distal end of the lens cover, and
the groove includes a latching prong that latches the latching protrusion of the lens cover when the lens cover is fitted to the groove.

6. The projector according to claim 1, wherein
the groove includes a latching prong,
the lens cover further includes a latching protrusion at the distal end of the lens cover, and
the latching protrusion latches the latching prong of the groove when the lens cover is fitted to the groove.

* * * * *